(12) United States Patent
Yokoyama et al.

(10) Patent No.: US 11,221,050 B2
(45) Date of Patent: Jan. 11, 2022

(54) DISC BRAKE

(71) Applicant: TOYOTA JIDOSHA KABUSHIKI KAISHA, Toyota (JP)

(72) Inventors: Tomohiro Yokoyama, Toyota (JP); Kazuya Hamaguchi, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/787,507

(22) Filed: Feb. 11, 2020

(65) Prior Publication Data

US 2020/0278001 A1 Sep. 3, 2020

(30) Foreign Application Priority Data

Feb. 28, 2019 (JP) .............................. JP2019-035680

(51) Int. Cl.
| | | |
|---|---|---|
| *F16D 55/18* | (2006.01) | |
| *F16D 55/227* | (2006.01) | |
| *F16D 65/18* | (2006.01) | |
| *F16D 55/226* | (2006.01) | |
| *F16D 125/10* | (2012.01) | |
| *F16D 121/04* | (2012.01) | |

(52) U.S. Cl.
CPC ......... *F16D 55/227* (2013.01); *F16D 55/226* (2013.01); *F16D 65/18* (2013.01); *F16D 2121/04* (2013.01); *F16D 2125/10* (2013.01)

(58) Field of Classification Search
CPC ...... F16D 55/22; F16D 55/224; F16D 55/225; F16D 55/226; F16D 2055/0025; F16D 2055/0066; F16D 65/183
See application file for complete search history.

(56) References Cited

U.S. PATENT DOCUMENTS 3,245,500 A * 4/1966 Hambling ........... F16D 55/2262
188/72.6
3,767,017 A * 10/1973 Maurice .............. F16D 55/2262
188/72.5
(Continued)

FOREIGN PATENT DOCUMENTS

DE 2738743 A1 * 3/1979 ........... F16D 55/224
GB 1365659 A 9/1974
(Continued)

OTHER PUBLICATIONS

Machine translation of DE 2738743 (no date).*

*Primary Examiner* — Nicholas J Lane
(74) *Attorney, Agent, or Firm* — Sughrue Mion, PLLC (57) ABSTRACT

A disc brake includes an inner pad and an outer pad, a pressing device, and a housing. The pressing device includes: at least one first pressing member movable toward a rotor and at least one second pressing member movable away from the rotor; and a frame held by the housing movably in an axial direction and configured to be moved by movement of the at least one second pressing member. A point of action of a resultant force of at least one pressing force applied from the at least one first pressing member to the inner pad is located on a trailing side of a centroid of the inner pad, and/or a point of action of a resultant force of at least one pressing force applied from the at least one second pressing member to the frame is located on a leading side of a frame central axis.

10 Claims, 7 Drawing Sheets

(56) References Cited

U.S. PATENT DOCUMENTS

| | | | |
|---|---|---|---|
| 4,775,034 A * | 10/1988 | Pachner | F16D 55/227 |
| | | | 188/73.45 |
| 2018/0195564 A1 | 7/2018 | Yoshikawa et al. | |
| 2019/0176781 A1 | 6/2019 | Yokoyama | |

FOREIGN PATENT DOCUMENTS

| | | |
|---|---|---|
| JP | 2017-20644 A | 1/2017 |
| JP | 2017-207104 A | 11/2017 |
| JP | 2019-100530 A | 6/2019 |

* cited by examiner

DISC BRAKE

CROSS REFERENCE TO RELATED APPLICATION

The present application claims priority from Japanese Patent Application No. 2019-035680, which was filed on Feb. 28, 2019, the disclosure of which is herein incorporated by reference in its entirety.

The following disclosure relates to a disc brake mounted on a wheel of a vehicle.

Patent Document 1 (Japanese Patent Application Publication No. 2017-020644) discloses a floating-type disc brake including: an inner pad and an outer pad respectively located on opposite sides of a rotor rotatable with a wheel; a pressing device configured to press the inner pad and the outer pad against the rotor; and a housing mounted on a non-rotating member and holding the pressing device. The pressing device includes: one first pressing member held by the housing and movable toward the rotor; one second pressing member held by the housing and movable away from the rotor; and a caliper held on the housing so as to be movable in a direction parallel with a rotation axis of the rotor and configured to move in response to movement of the second pressing member to press the outer pad against the rotor. The caliper has such a shape that extends over outer circumferential surfaces of the inner pad and the outer pad.

SUMMARY

Accordingly, an aspect of the disclosure relates to improvement of a disc brake including a first pressing member and a second pressing member and to a technique of reducing partial wear of at least one of an outer pad and an inner pad, for example.

In a disc brake according to one aspect of the disclosure, at least one first pressing member and at least one second pressing member are provided. In the case where the point of action of a pressing force of at least one second pressing member is located on a leading side of a central axis of a frame in a circumferential direction, it is possible to suppress moment produced on the frame, in the case where the point of action of a pressing force of at least one second pressing member is located at the same position as the central axis of the frame in the circumferential direction. This makes it possible to uniform a surface pressure applied to the outer pad, thereby reducing partial wear. In the case where the point of action of the pressing force of the at least one first pressing member is located on a trailing side of a centroid of an inner pad in the circumferential direction, it is possible to suppress moment produced on the inner pad, uniform a surface pressure applied to the inner pad, and reduce partial wear when compared with the case where the point of action of the pressing force of the at least one first pressing member is located at the same position as the centroid of the inner pad in the circumferential direction.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

First Embodiment

A disc brake according to the present embodiment is a floating disc brake which is provided on a wheel of a vehicle and operable by a hydraulic pressure. As illustrated in FIGS. 1-4, the disc brake includes: a rotor 3 that is rotated together with a wheel; an inner pad 4 and an outer pad 6 located on opposite sides of the rotor 3; a pressing device 8; and a housing 10 holding the pressing device 8. The pressing device 8 includes first and second wheel cylinders 14$a$, 14$b$ and a frame 16. As illustrated in FIG. 2, the rotation axis L of the rotor 3 and the central axis of the pressing device 8 are parallel with each other. In the following description, the central axis of the pressing device 8 may be referred to as "reference central axis C". Also, each of the direction parallel with the rotation axis L of the rotor 3 and the direction parallel with the reference central axis C of the pressing device 8 may be referred to simply as "axial direction". A side on which the outer pad 6 is located in the axial direction is an outer side in the vehicle, and a side on which the inner pad 4 is located in the axial direction is an inner side in the vehicle. The outer side in the vehicle and the inner side in the vehicle may be hereinafter referred to simply as "outer side" and "inner side", respectively.

Figure 1:
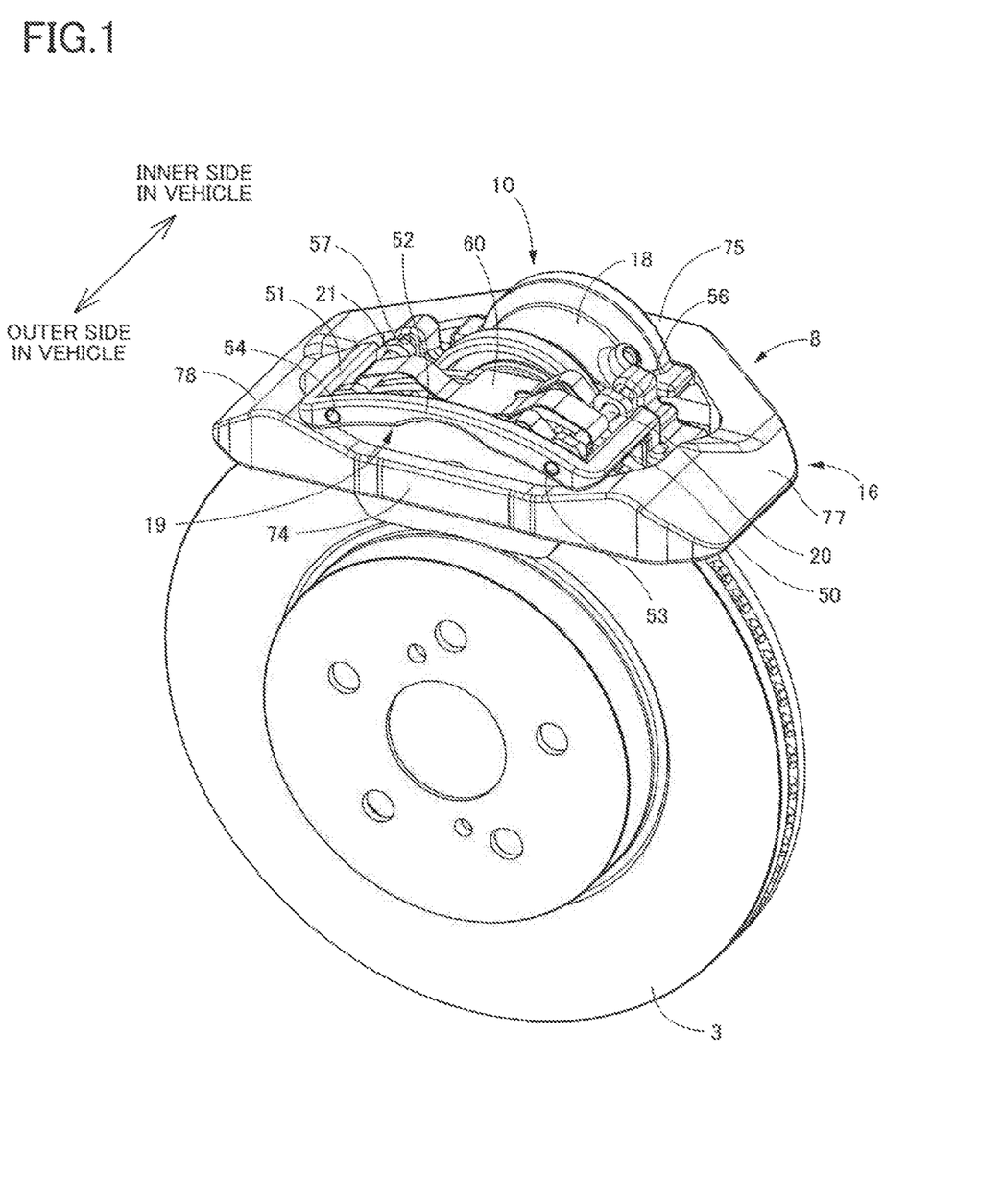
FIG. 1 is a perspective view of a disc brake according to a first embodiment.
Figure 2:
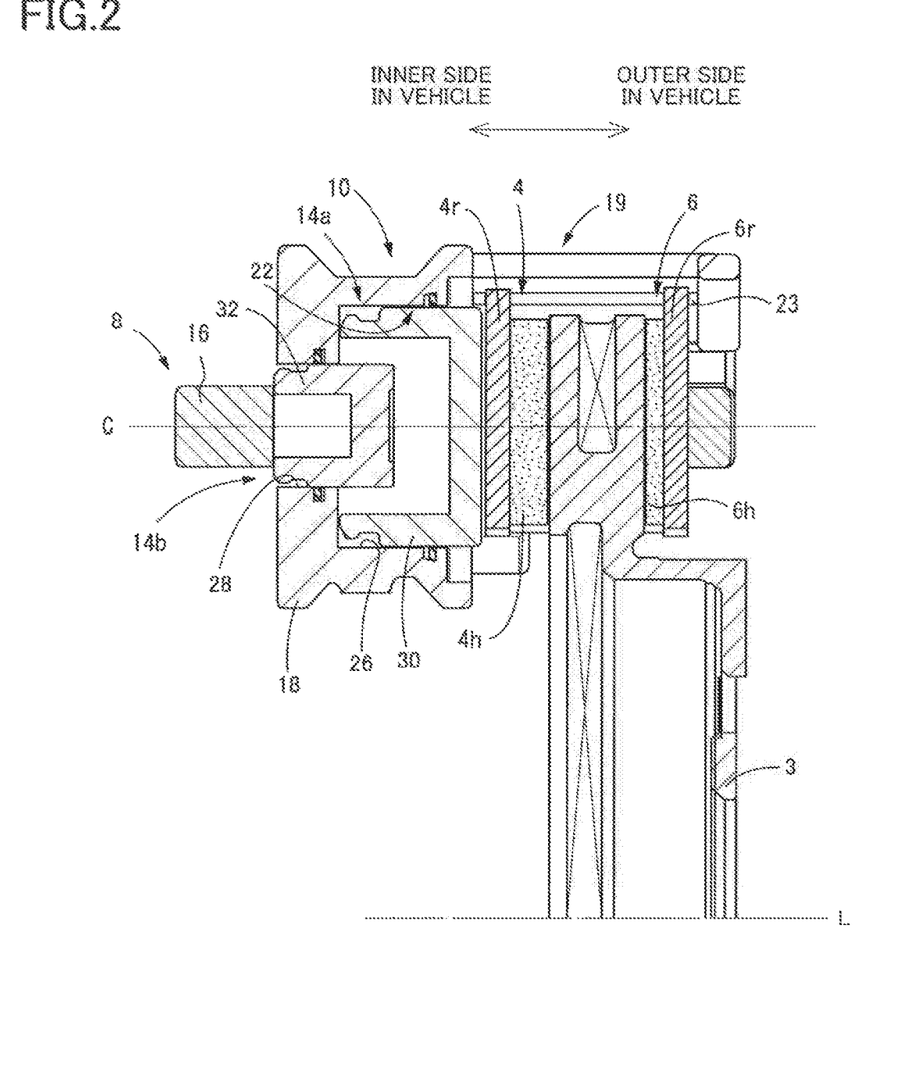
FIG. 2 is a cross-sectional view taken along a plane parallel with a rotation axis of the disc brake.
Figure 4:
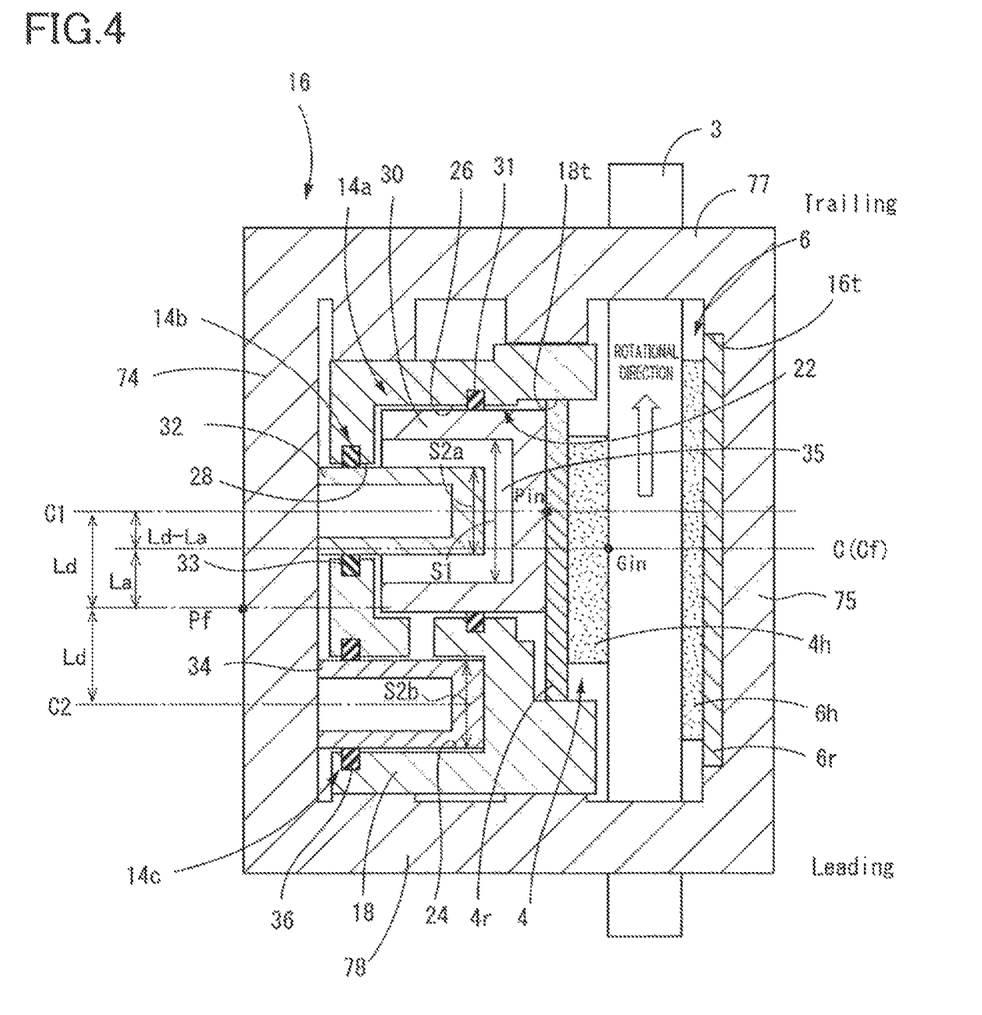
FIG. 4 is a view conceptually illustrating a pressing device of the disc brake.

As illustrated in FIG. 1, the housing 10 includes: a main housing portion 18 located on an inner side of the rotor 3 in the vehicle; a bridge portion 19 extending from the main housing portion 18 toward an outer side over the rotor 3 in the vehicle; and a pair of pad pins 20, 21 spaced apart from each other in the circumferential direction of the rotor 3 (which may be hereinafter referred to simply as "the circumferential direction"). The main housing portion 18 extends substantially in the axial direction. As illustrated in FIG. 4, a through hole 22 and a cylinder bore 24 are formed in the main housing portion 18. The through hole 22 is formed through the main housing portion 18 in the axial direction. The cylinder bore 24 opens in a direction away from the rotor 3. Each of the through hole 22 and the cylinder bore 24 extends in the axial direction. The central axis C1 of the through hole 22 is located on a trailing side of the reference central axis C. The central axis C2 of the cylinder bore 24 is located on a leading side of the reference central axis C. The central axis C1, the central axis C2, and the reference central axis C are spaced apart from each other in the circumferential direction and parallel with each other. The through hole 22 and the cylinder bore 24 communicate with each other and share a hydraulic-pressure chamber 35.

The through hole 22 has a substantially stepped shape and includes a large-diameter portion 26 and a small-diameter portion 28. The large-diameter portion 26 is nearer to the rotor 3 than the small-diameter portion 28. A first piston 30 as one example of a first pressing member is fluid-tightly and slidably fitted in the large-diameter portion 26 via a piston seal 31. A second piston 32 as one example of a second pressing member is fluid-tightly and slidably fitted in the small-diameter portion 28 via a piston seal 33. Each of the first piston 30 and the second piston 32 has a cylindrical shape having a closed bottom and is disposed such that its bottom portion is nearer to the rotor 3 than its cylindrical portion. The outside diameter of the second piston 32 is less than the inside diameter of the first piston 30. Thus, the bottom portion of the second piston 32 is located on an inner circumferential side of the cylindrical portion of the first piston 30, and the cylindrical portion of the second piston 32 partly protrudes from the first piston 30 such that an open end portion of the cylindrical portion is opposed to the frame 16. A space is formed between an inner circumferential surface of the first piston 30 and an outer circumferential surface of the second piston 32 to allow the first piston 30 and the second piston 32 to move relative to each other in the axial direction.

A second piston 34 as another example of a second pressing member is fluid-tightly and slidably fitted in the cylinder bore 24 via a piston seal 36. The second piston 34 has a substantially cylindrical shape having a closed bottom and is disposed such that its bottom portion is nearer to the rotor 3 than its cylindrical portion. It is noted that the cylinder bore 24 and the small-diameter portion 28 have substantially the same inside diameter.

The second piston 32 and the first piston 30 are located on the same central axis C1, and a portion of the second piston 32 and a portion of the first piston 30 overlap each other in the radial direction. The second piston 34 is located on the central axis C2 that is spaced apart from the central axis C1 in the circumferential direction. Thus, when viewed in the axial direction, the second piston 34 and each of the first piston 30 and the second piston 32 are spaced apart from each other in the circumferential direction. When viewed in a direction orthogonal to the axial direction (that is, when viewed in the circumferential direction), a portion of the first piston 30 and a portion of each of the second pistons 32, 34 overlap each other. A portion of the cylinder bore 24 which is located outside the second piston 34 communicates with a space located on an inner circumferential side of the first piston 30 and on an outer side of the second piston 32, and the portion of the cylinder bore 24 and the space form the hydraulic-pressure chamber 35. A hydraulic pressure in the hydraulic-pressure chamber 35 moves the first piston 30 toward the rotor 3 and moves the second pistons 32, 34 away from the rotor 3.

As illustrated in FIG. 4, the second pistons 32, 34 have substantially the same outside diameter, and the same hydraulic pressure acts on the second pistons 32, 34. Thus, the point of action of a resultant force $2f$ of a pressing force f applied from the second pistons 32, 34 to the frame 16 is located at a midpoint Pf (Ld=Ld) of the central axes C1, C2 in the circumferential direction. The distance (Ld−La) between the central axis C1 and the reference central axis C in the circumferential direction is less than the distance (Ld+La) between the central axis C2 and the reference central axis C in the circumferential direction. Thus, the point Pf of action is located at a distance La from the reference central axis C toward the leading side in the circumferential direction. In the present embodiment, the reference central axis C of the pressing device 8 and the central axis of the frame 16 (which may be hereinafter referred to as "frame central axis Cr") are located at substantially the same position in the circumferential direction. Thus, the distance La between the reference central axis C and the point Pf of action of the pressing force of the second pistons 32, 34 in the circumferential direction is substantially equal to the distance La between the frame central axis Cf and the point Pf of action in the circumferential direction.

Figure 3:
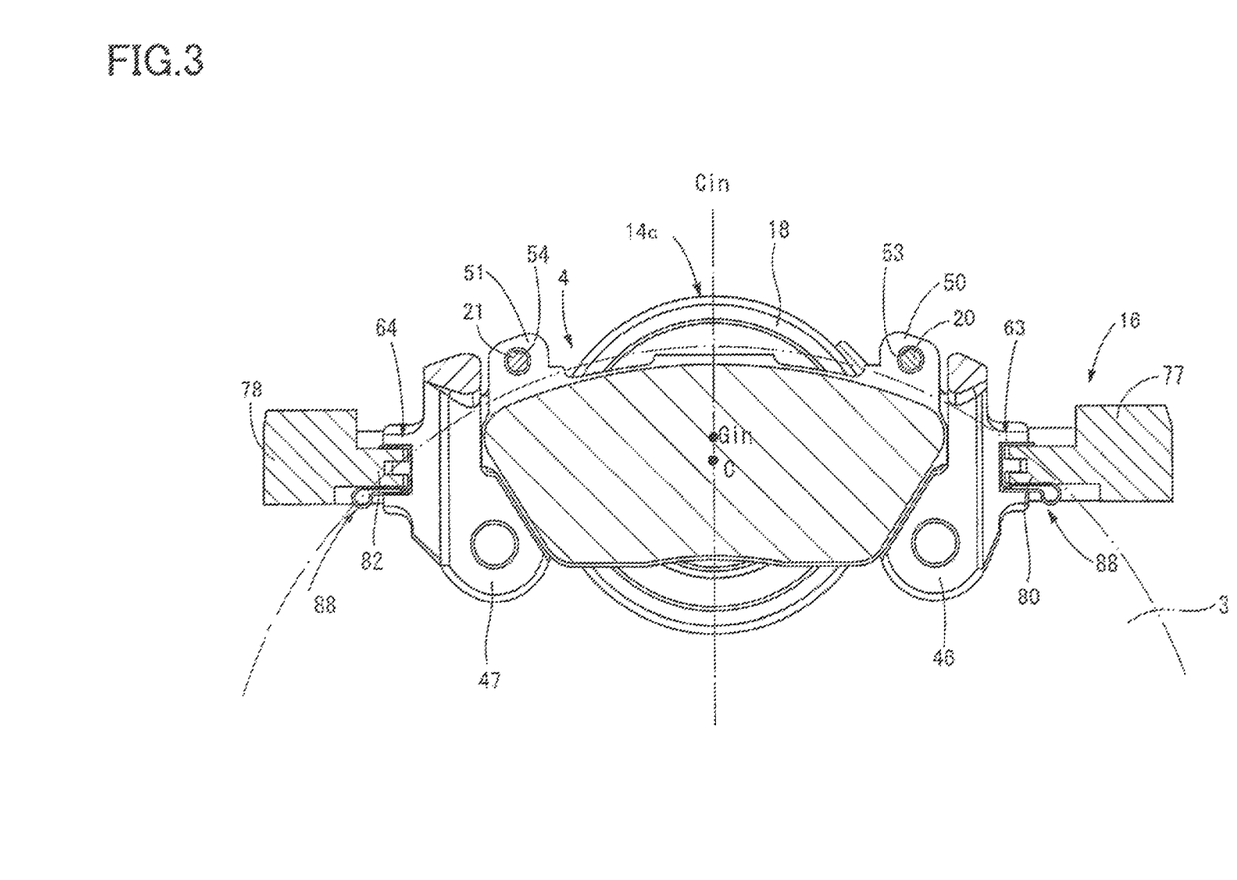
FIG. 3 is a cross-sectional view taken along a plane orthogonal to the rotation axis of the disc brake.

The point of action of the pressing force applied from the first piston 30 to the inner pad 4 is located on the central axis C1 at a point Pin located at the distance (Ld−La) from the reference central axis C toward the trailing side in the circumferential direction. As illustrated in FIG. 3, a centroid Gin of the inner pad 4 is located on a line C in orthogonal to the reference central axis C and extending substantially in the radial direction. In other words, the centroid Gin of the inner pad 4 and the reference central axis C are located at substantially the same position in the circumferential direction. Thus, the distance (Ld−La) between the reference central axis C and the point Pin of action of the pressing force of the first piston 30 in the circumferential direction is substantially equal to the distance (Ld−La) between the centroid Gin of the inner pad 4 and the point Pin of action in the circumferential direction.

In the present embodiment, a portion of the main housing portion 18 in which the large-diameter portion 26 of the through hole 22 is formed serves as a first cylinder body, and a first wheel cylinder 14a is constituted by the first cylinder body, the first piston 30, and so on. A portion of the main housing portion 18 in which the small-diameter portion 28 of the through hole 22 is formed serves as a second cylinder body, and a second wheel cylinder 14b is constituted by the second piston 32, the second cylinder body, and an inner circumferential portion of the first piston 30, for example. A portion of the main housing portion 18 in which the cylinder bore 24 is formed serves as the second cylinder body, and a second wheel cylinder 14c is constituted by the second cylinder body and the second piston 34, for example. It is possible to consider that one wheel cylinder is constituted by a portion of the main housing portion 18 in which the through hole 22 is formed, the portion of the main housing portion 18 in which the cylinder bore 24 is formed, the first piston 30, and the second pistons 32, 34, for example.

In the present embodiment, an outer surface of the bottom portion of each of the second pistons 32, 34 receives the hydraulic pressure in the hydraulic-pressure chamber 35. Thus, the area of the outer surface of the bottom portion is a pressure receiving area. The pressure receiving areas S2a, S2b of the respective second pistons 32, 34 are substantially equal to each other (S2a≈S2b). Since the first piston 30 receives the hydraulic pressure in the hydraulic-pressure chamber 35 at the bottom surface of the inner circumferential portion of the cylindrical portion of the first piston 30, the area of the bottom surface of the inner circumferential portion of the cylindrical portion of the first piston 30 is a pressure receiving area S1. In the present embodiment, the sum S2 (=S2a+S2b) of the pressure receiving areas S2a, S2b of the respective second pistons 32, 34 is substantially equal to the pressure receiving area S1 of the first piston 30 (S1≈S2). Thus, a pressing force acting on the inner pad 4 and a pressing force acting on the outer pad 6 are substantially equal to each other.

As illustrated in FIG. 3, a pair of mount portions 46, 47 are provided on opposite sides, in the circumferential direction, of a rotor-side end portion of the main housing portion 18 in the axial direction. Each of the mount portions 46, 47 is secured to a corresponding one of suspension members (which may be also referred to as "vehicle-body-side component") such as a knuckle as one example of a non-rotating member.

As illustrated in FIG. 1, the bridge portion 19 has a substantially three-sided rectangular shape in plan view. The bridge portion 19 includes: a pair of rods 50, 51 spaced apart from each other in the circumferential direction and each extending in the axial direction; and a coupler 52 coupling the rods 50, 51 to each other. The coupler 52 has two through holes 53, 54 spaced apart from each other in the circumferential direction. Through holes 56, 57 are respectively formed in portions of the main housing portion 18 which correspond to the respective through holes 53, 54. The pad pin 20 is fit in the through holes 53, 56, and the pad pin 21 is fit in the through holes 54, 57 in a state in which the pad pins 20, 21 extend in the axial direction. Each of the pad pins 20, 21 extends through a corresponding one of the through holes 56, 57, the inner pad 4, the outer pad 6, and a corresponding one of the through holes 53, 54 in this order. Thus, the inner pad 4 and the outer pad 6 are held by the pad pins 20, 21 so as to be movable in the axial direction. It is noted that a pad spring 60 is attached to the pad pins 20, 21 to reduce looseness, and so on of the inner pad 4 and the outer pad 6, resulting in reduced vibrations and abnormal sounds.

Two pairs of engageable recessed portions engageable with the frame 16 are provided on the main housing portion 18 so as to be spaced apart from each other in the axial direction. FIG. 3 illustrates only one of the two pairs of engageable recessed portions and omits illustration of the other. As illustrated in FIG. 3, the two pairs of engageable recessed portions include: the one pair of engageable recessed portions 63, 64 provided at the rotor-side end portion of the main housing portion 18; and the other pair of engageable recessed portions, not illustrated, provided at an end portion of the main housing portion 18 which is far from the rotor 3. The engageable recessed portions 63, 64 are spaced apart from each other in the circumferential direction.

As illustrated in FIG. 1, the frame 16 is a rigid member having a substantially frame shape and held by the main housing portion 18 so as to be movable relative to each other in the axial direction. As illustrated in FIG. 4, the frame 16 includes: a first side portion 74 and a second side portion 75 extending in a direction orthogonal to the reference central axis C and spaced apart from each other in the axial direction; and a third side portion 77 and a fourth side portion 78 extending in a direction intersecting the first side portion 74 and the second side portion 75 and spaced apart from each other in the circumferential direction. The third side portion 77 and the fourth side portion 78 couple the first side portion 74 and the second side portion 75 to each other. The first side portion 74 and the second side portion 75 are located on opposite sides of the rotor 3 in the axial direction. The first side portion 74 is located on an inner side of the rotor 3 in the vehicle and opposed to the second piston 34. The second side portion 75 is located on an outer side of the rotor 3 in the vehicle and engaged with the outer pad 6. In the present embodiment, the outer pad 6 is fitted in the second side portion 75 so as to be movable together with the second side portion 75.

Each of the third side portion 77 and the fourth side portion 78 extends toward the outer and inner sides of the rotor 3. Specifically, as illustrated in FIGS. 1 and 3, each of the third side portion 77 and the fourth side portion 78 extends over the rotor 3 without extending over outer circumferential surfaces of the inner pad 4 and the outer pad 6 in the radial direction.

As illustrated in FIG. 3, two pairs of engageable protrusions are provided on inner surfaces of the third side portion 77 and the fourth side portion 78 which face each other at positions located on an inner side of the rotor 3 in the vehicle. One pair of the two pairs of engageable protrusions (a pair of engageable protrusions 80, 82) are located nearer to the rotor 3 than the other pair of engageable protrusions, not illustrated.

These engageable protrusions 80, 82 of the frame 16 are engaged with the respective engageable recessed portions 63, 64 of the main housing portion 18, whereby the frame 16 is held by the housing 10 so as to be movable relative to the housing 10 in the axial direction. It is noted that leaf springs in the form of springs 88 are respectively provided between the engageable protrusion 80 and the first engageable recessed portion 63 and between the engageable protrusion 82 and the first engageable recessed portion 64. This configuration reduces positional misalignment of the frame 16 relative to the main housing portion 18 in the radial direction and the circumferential direction, resulting in reduced vibrations and abnormal sounds.

In the present embodiment, the volume of an inner-side friction engagement member 4h that is a friction engagement member of the inner pad 4 and that of an outer-side friction engagement member 6h that is a friction engagement member of the outer pad 6 are equal to each other. This configuration reduces a difference in useful life between the inner-side friction engagement member 4h and the outer-side friction engagement member 6h. A pressing force is applied to the outer pad 6 when the frame 16 is moved by the two second pistons 32, 34 spaced apart from each other in the circumferential direction. With this configuration, even in the case where the area of the outer-side friction engagement member 6h is greater than that of the inner-side friction engagement member 4h, it is possible to uniform a surface pressure applied to the outer-side friction engagement member 6h.

The disc brake configured as described above is operated by the hydraulic pressure in the hydraulic-pressure chamber 35 defined by the first wheel cylinder 14a and the second wheel cylinders 14b, 14c. A force produced by the hydraulic pressure which is obtained by multiplying the hydraulic pressure in the hydraulic-pressure chamber 35 by the pressure receiving area of each piston is applied to a corresponding one of the first piston 30 and the second pistons 32, 34. The first piston 30 is moved toward the rotor 3 in the axial direction to press the inner pad 4 against the rotor 3. The second pistons 32, 34 are moved away from the rotor 3 in the axial direction to move the frame 16 that presses the outer pad 6 against the rotor 3. The rotor 3 is pressed by the inner pad 4 and the outer pad 6 from opposite sides of the rotor 3, whereby the rotor 3 and each of the inner pad 4 and the outer pad 6 are brought into frictional engagement with each other. This actuates the disc brake to reduce rotation of the rotor 3, thereby reducing rotation of the wheel. In the case where the disc brake is actuated in the case where the wheel is rotating in the direction indicated by arrow illustrated in FIG. 4, torque of the inner pad 4 is received by a torque receiver 18t of the main housing portion 18, and torque of the outer pad 6 is received by a torque receiver 16t of the second side portion 75 of the frame 16 which is located near the third side portion 77.

Figure 5:
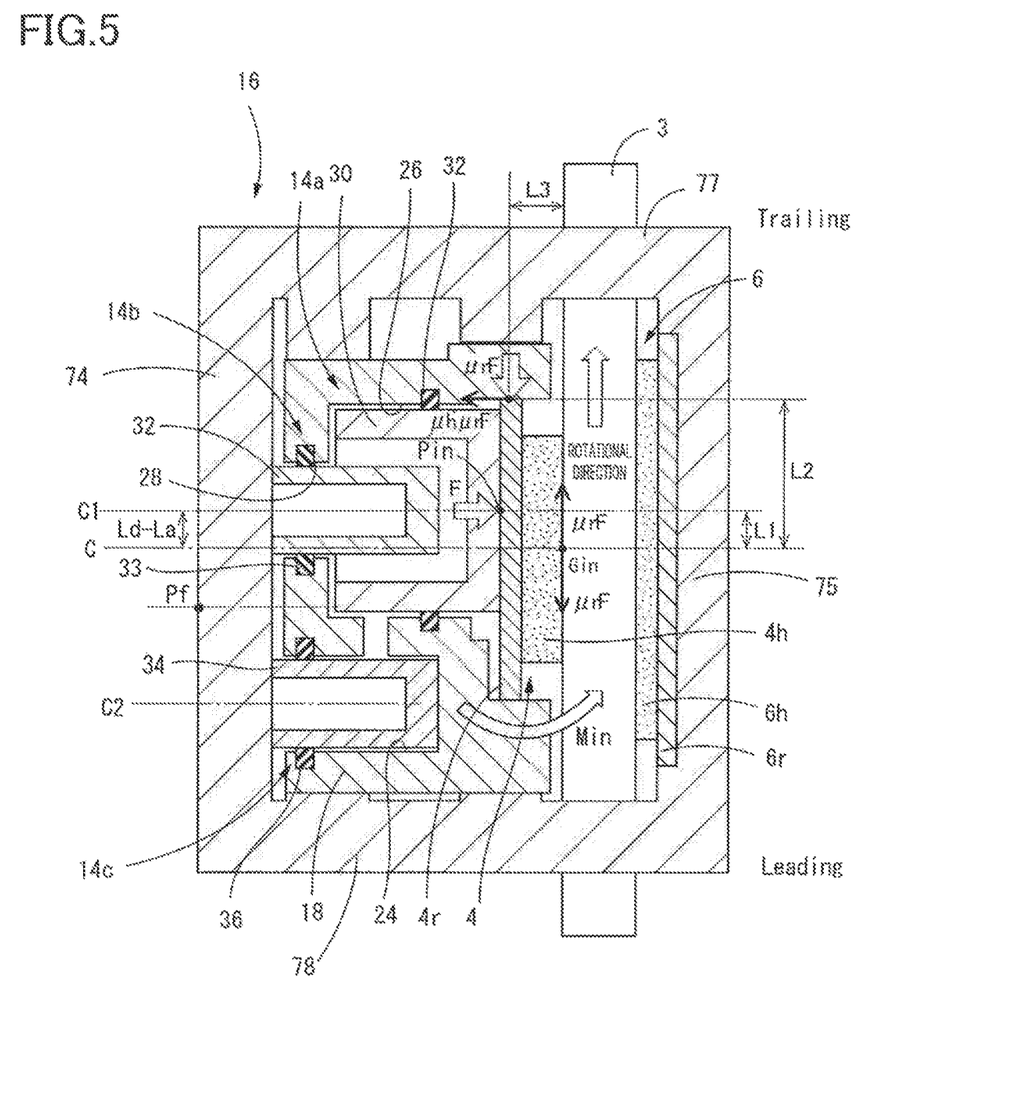
FIG. 5 is a view illustrating forces and a moment acting from the pressing device to an inner pad.

Now consider a moment produced around the centroid Gin of the inner pad 4 when the brake is operated. As illustrated in FIG. 5, the first piston 30 applies a pressing force F to the point Pin of action at the inner pad 4. In the case where the coefficient of friction between the rotor 3 and the inner pad 4 is defined as μr, a frictional force obtained by multiplying the coefficient μr by the pressing force F (=μrF) is applied to the rotor 3, and a force Fb (=μrF) equal in magnitude and opposite in direction to the frictional force is applied to the inner pad 4. The force Fb opposite in direction to the frictional force applied to the inner pad 4 is received by the torque receiver 18t of the main housing portion 18, and a reaction force Fb is applied from the torque receiver 18t to the inner pad 4. A friction force (Fb×μh) in the axial direction is applied to between the torque receiver 18t of the main housing portion 18 and a back board 4r, where μh represents the coefficient of friction between the main housing portion 18 and the back board 4r.

In the case where a distance between the centroid Gin of the inner pad 4 and the point Pin of action in the circumferential direction is defined as L1 (=Ld−La), a distance between the centroid Gin and the torque receiver 18t in the circumferential direction is defined as L2, a distance between the centroid Gin and the center point of the back board 4r in the axial direction is defined as L3, and a moment in the counterclockwise direction is positive, a moment Min expressed by the following equation (1) is applied to the inner pad 4:

$$Min=(Fb \times L3+\mu h \times Fb \times L2)-F \times L1 \quad (1)$$

$$Fb=\mu r \times F$$

In the case where the distance L1 between the central axis C1 of the first piston 30 and the centroid Gin in the circumferential direction is zero, the moment Min as indicated by the arrow in FIG. 5 is applied to the inner pad 4.

In the present embodiment, in contrast, the central axis C1 of the first piston 30 is located at a distance from the centroid Gin toward the trailing side in the circumferential direction. With this configuration, the distance L1 can be designed such that the moment Min is equal to zero. In the case where the moment Min is equal to zero in the above-described equation (1), the distance L1 is determined as in the following equation (2):

$$Min=0$$

$$L1=\mu r \times (L3+\mu h \times L2) \quad (2)$$

Thus, the distance L1 between the centroid Gin of the inner pad 4 and the point Pin of action in the circumferential direction is determined by the equation (2), the moment Min applied to the inner pad 4 is equal to zero. Making the distance L1 greater than zero reduces the moment Min. Thus, it is possible to uniform a surface pressure applied to the inner pad, resulting in reduced partial wear.

Figure 6:
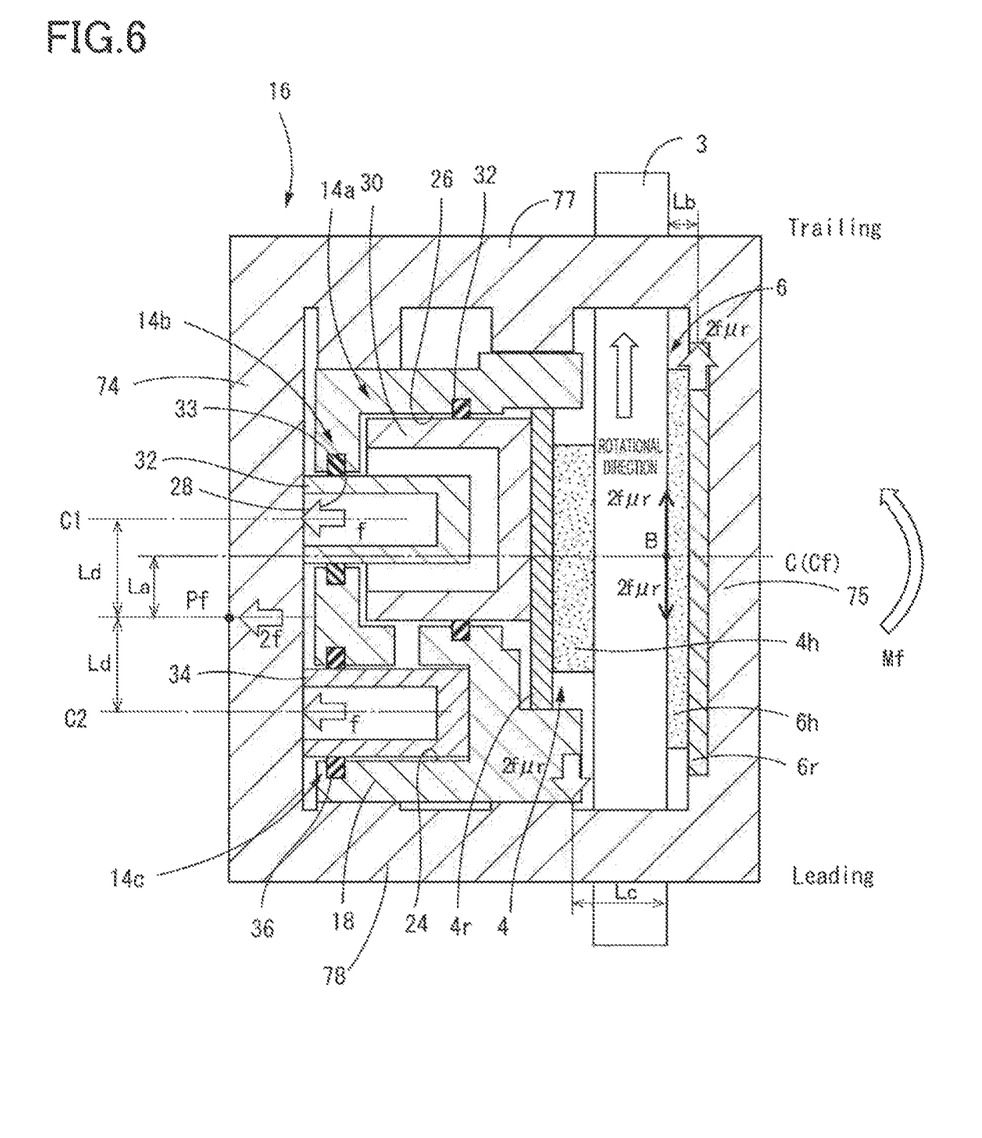
FIG. 6 is a view illustrating forces and a moment acting from the pressing device to a frame.

Next, consider a moment acting on a portion of the frame 16 around the point B when the brake is operated. As illustrated in FIG. 6, the pressing force 2f(=F) of the second pistons 32, 34 is applied to the first side portion 74 of the frame 16, and the pressing force 2f causes the second side portion 75 of the frame 16 to press the outer pad 6 against the rotor 3. A frictional force (=2fμr) obtained by multiplying the pressing force 2f by the coefficient of friction μr between the rotor 3 and the outer pad 6 is applied to the rotor 3, and the force Fb (=2 fμr) equal in magnitude and opposite in direction to the frictional force is applied to the outer pad 6. The force Fb is applied from a back board 6r of the outer pad 6 to the torque receiver 16t of the frame 16. The force Fb of the outer pad 6 applied to the torque receiver 16t of the frame 16 is received by the main housing portion 18, whereby the reaction force Fb (2fμr) is applied from the main housing portion 18 to a portion of the frame 16 (e.g., the fourth side portion 78) which is located on an opposite side from the torque receiver 16t (the portion of the second side portion 75 which is located near the third side portion 77) in the circumferential direction.

In the present embodiment, the distance between (i) the point Pf of action on the frame 16 to which the resultant force 2f of the pressing forces f of the respective second pistons 32, 34 is applied and (ii) the point B (the point on the frame central axis Cf) is defined as La, a distance between the center point of the torque receiver 16t of the frame 16 and the point B in the axial direction is defined as Lb, and a distance in the axial direction between the point B and a portion of the frame 16 which receives a reaction force from the main housing portion 18 is defined as Lc, a moment Mf expressed by the following equation (3) acts around the point B on the frame 16:

$$Mf=\mu r \times 2f \times Lc+\mu r \times 2f \times Lb-2f \times La \quad (3)$$

In the case where the distance La is equal to zero, the moment Mf is a positive value according to equation (3). As illustrated in FIG. 6, the moment in the counterclockwise direction indicated by arrow Mf is produced on the frame 16. This easily forces the frame 16 to move while rubbing against the housing 10. In the present embodiment, in contrast, the resultant force 2f of the pressing forces of the respective second pressing members 32, 34 is applied to the point Pf of action located at a distance from the frame central axis Cf (the point B) toward the leading side in the circumferential direction. Thus, it is possible to design the distance La such that the moment Mf is equal to zero.

$$Mf=0$$

$$La=\mu r \times (Lc+Lb) \quad (4)$$

In the case where the distance La in the circumferential direction between the point B (the point on the frame central axis Cf) and the point Pf of action to which the resultant force 2f of the pressing forces f of the respective second pressing members 32, 34 is applied is determined according to equation (4), or in the case where the distance La is set to a value greater than zero, the moment Mf applied to the frame 16 can be made zero or reduced. This uniforms a surface pressure applied to the outer pad 6, resulting in reduced partial wear.

Since partial wear of the inner pad 4 and the outer pad 6 is suppressed, it is possible to reduce the consumption of working liquid for operation of the disc brake to reduce lowering of response. Also, since creaking of the frame 16 is reduced, it is possible to suppress vibrations to reduce lowering of a braking force.

When viewed in the circumferential direction, the first piston 30 and each of the second piston 32, 34 partly overlap each other. When viewed in the axial direction, the second piston 34 and each of the second piston 32 and the first piston 30 are spaced apart from each other. This configuration reduces the length of the disc brake in the axial direction when compared with the case where the first piston 30 and each of the second pistons 32, 34 are arranged side by side in the axial direction.

The sum (S2a+S2b) of the pressure receiving areas of the respective second pistons 32, 34 with respect to the hydraulic-pressure chamber 35 is substantially equal to the pressure receiving area S1 of the first piston 30 with respect to the hydraulic-pressure chamber 35. Thus, the force F applied to the inner pad 4 in the axial direction can be made equal to the force 2f (=F) applied to the outer pad 6 in the axial direction, making it possible to stably operating the disc brake.

In the above-described embodiment, the two second pistons 32, 34 have substantially the same pressure receiving area. Thus, the distance between the reference central axis C and the second central axis C1 of the second piston 32 and the distance between the reference central axis C and the second central axis C2 of the second piston 34 are made different from each other. As a result, the resultant force of the pressing forces of the respective second pistons 32, 34 is applied to the position located at a distance from the frame central axis Cf toward the leading side. In contrast, in the case where the distance between the reference central axis C and the second central axis C1 of the second piston 32 and the distance between the reference central axis C and the second central axis C2 of the second piston 34 are substantially equal to each other, making the pressure receiving area S2b of the second piston 34 greater than the pressure receiving area S2a of the second piston 32 makes it possible to set the point Pf of action of the resultant force of the pressing forces of the respective second pistons 32, 34 to a position located at a distance from the frame central axis Cf toward the leading side. By making the pressure receiving areas of the respective second pistons 32, 34 different from each other and making the distance between the central axis C1 and the frame central axis Cf and the distance between the central axis C2 and the frame central axis Cf different from each other, it is possible to set the point Pf of action to a position located at a distance from the frame central axis Cf toward the leading side.

The number of the second pistons may be one or three or more, and a plurality of the first pistons may be provided. The disc brake is not limited to the hydraulic disc brake and may be an electric disc brake including an electric actuator. It is not essential that the outer pad 6 is fitted to the frame 16, and the second side portion 75 of the frame 16 at least needs to be opposed to the outer pad 6.

In the present embodiment as described above, the central axis C1 is one example of each of a first central axis and a second central axis, and the central axis C2 is another example of the second central axis. The central axis C1 is one example of a trailing-side second central axis, and the central axis C2 is one example of a leading-side second central axis. The first piston 30 is one example of a selected first pressing member, and the second piston 32 is one example of a selected second pressing member.

Second Embodiment

Figure 7:
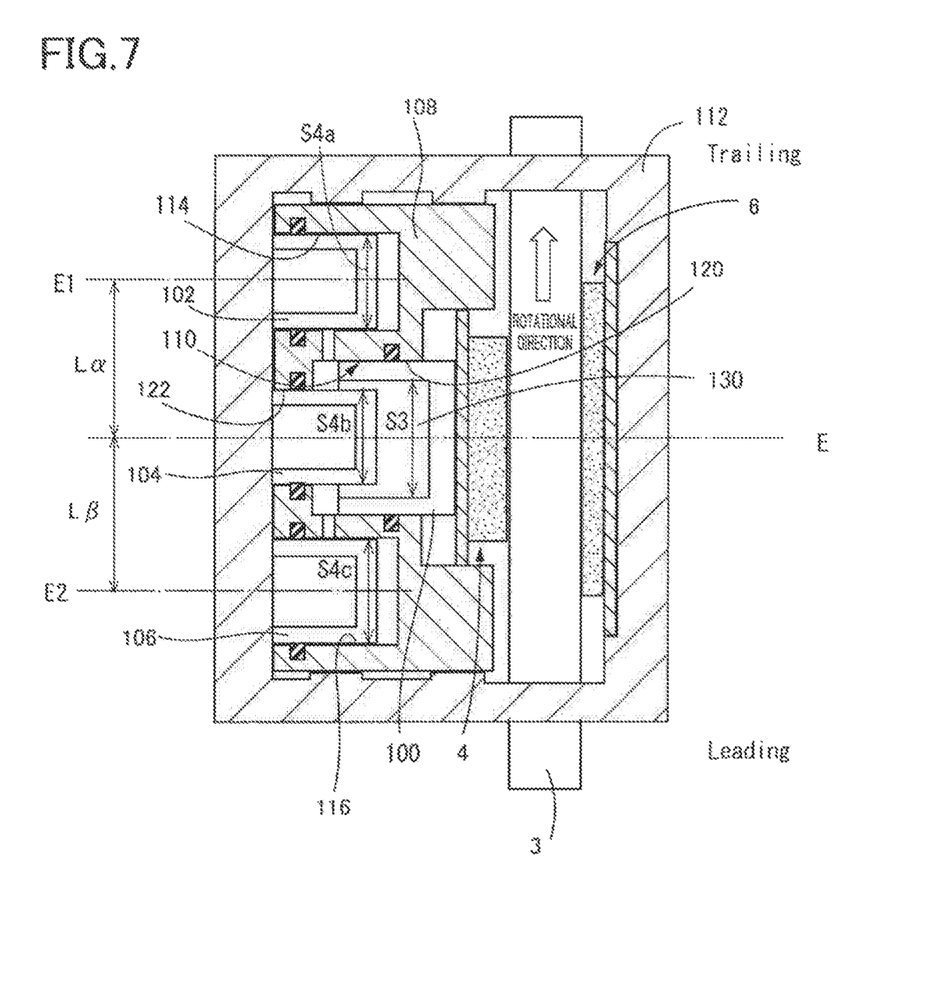
FIG. 7 is a view conceptually illustrating a pressing device of a disc brake according to a second embodiment.

As illustrated in FIG. 7, a disc brake according to the present embodiment includes: a single first piston 100 having a substantially cylindrical shape having a closed bottom as another example of the first pressing member; and second pistons 102, 104, 106 provided arranged side by side in the circumferential direction as one example of three second pressing members. A main housing portion 108 has: a through hole 110 formed through the main housing portion 108 in the axial direction and having a substantially stepped shape; and two cylinder bores 114, 116 each extending in the axial direction and opening so as to be opposed to a frame 112. The two cylinder bores 114, 116 are formed on opposite sides of the through hole 110 in the circumferential direction. The through hole 110 is formed such that its axis coincides with a reference central axis E. The through hole 110 includes: a large-diameter portion 120 in which the first piston 100 is fluid-tightly and slidably fitted; and a small-diameter portion 122 in which the second piston 104 is fluid-tightly and slidably fitted. The second piston 104 is a central one of the three second pistons 102, 104, 106. The second pistons 102, 106 are fluid-tightly and slidably fitted in the respective cylinder bores 114, 116. The distance between the central axis E1 of the second piston 102 and the reference central axis E is $L\alpha$. The distance between the central axis E2 of the second piston 106 and the reference central axis E is $L\beta$.

Each of the first piston 100 and the second piston 104 has a substantially cylindrical shape having a closed bottom and is disposed such that its bottom portion is nearer to the rotor 3 than its cylindrical portion. A bottom portion of the first piston 100 is opposed to the inner pad 4. A bottom portion of the second piston 104 is located on an inner circumferential side of a cylindrical portion of the first piston 100. An open end portion of the cylindrical portion of the second piston 104 is opposed to the frame 112. In the present embodiment, when viewed in the axial direction, the second piston 102, each of the first piston 100 and the second piston 104, and the second piston 106 are spaced apart from each other in the circumferential direction. When viewed in the circumferential direction, a portion of each of the second pistons 102, 104, 106 and a portion of the first piston 100 overlap each other in the axial direction. This configuration reduces the length of the disc brake in the axial direction.

A space located on an inner circumferential side of the cylindrical portion of the first piston 100 communicates with a portion of each of the cylinder bores 114, 116 which is located outside a corresponding one of the second pistons 102, 106, and the space and the portion of each of the cylinder bores 114, 116 form a common hydraulic-pressure chamber 130. A hydraulic pressure in the hydraulic-pressure chamber 130 moves the first piston 100 toward the rotor 3 to press the inner pad 4 against the rotor 3. The second pistons 102, 104, 106 are moved away from the rotor 3 to move the frame 112 to press the outer pad 6 against the rotor 3. As a result, the rotor 3 and each of the inner pad 4 and the outer pad 6 are brought into frictional engagement with each other to actuate the disc brake.

For example, in the case where the pressure receiving area S3 of the first piston 100 with respect to the hydraulic-pressure chamber 130 is substantially equal to the sum of the pressure receiving areas S4a, S4b, S4c (S4=S4a+S4b+S4c) of the respective second pistons 102, 104, 106 with respect to the hydraulic-pressure chamber 130 (S3≈S4), pressing forces having the same magnitude can be applied respectively to the inner pad 4 and the outer pad 6, making it possible to stably operate the disc brake.

Even in the case where the pressure receiving areas S4a, S4c of the respective second pistons 102, 106 are substantially equal to each other (S4a≈S4c), when the distance $L\beta$ between the central axis E2 and the reference central axis E is greater than the distance $L\alpha$ between the central axis E1 and the reference central axis E ($L\beta > L\alpha$), the point of action of the resultant force of the pressing forces of the respective second pistons 102, 104, 106 can be set to a position located on a leading side of the reference central axis E (located at the same position as the central axis of the frame 112 in the circumferential direction). Likewise, even in the case where the distance $L\beta$ and the distance $L\alpha$ are substantially equal to each other ($L\beta \approx L\alpha$), when the pressure receiving area S4c of the second piston 106 is greater than the pressure receiving area S4a of the second piston 102 (S4c>S4a), the point of action of the sum of the pressing forces of the respective second pistons 102, 104, 106 can be set to a position located on a leading side of the central axis E of the frame 112. In these cases, reduction of the moment Mf applied to the frame 112 can uniform the surface pressure applied to the outer pad 6 to reduce partial wear.

Making the distance Lβ and the distance Lα different from each other and making the pressure receiving areas S4a, S4c of the respective second pistons 102, 106 different from each other may set the point of action of the resultant force of the pressing forces of the respective second pistons 102, 104, 106 to a position located on a leading side of the central axis E of the frame 112.

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, the reference central axis and the central axis of the frame coincide with each other in the above-described embodiment but may be different from each other in the circumferential direction.

Claimable Inventions (1) A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
  at least one first pressing member and at least one second pressing member held by the housing, the at least one first pressing member being movable toward the rotor, the at least one second pressing member being movable away from the rotor; and
  a frame held by the housing so as to be movable relative to the housing in an axial direction parallel with a rotation axis of the rotor, the frame being configured to be moved by movement of the at least one second pressing member to press the outer pad against the rotor, and
wherein the disc brake has at least one of (i) a configuration in which a point of action of a resultant force of at least one pressing force applied from the at least one first pressing member to the inner pad is located on a trailing side of a centroid of the inner pad, and (ii) a configuration in which a point of action of a resultant force of at least one pressing force applied from the at least one second pressing member to the frame is located on a leading side of a frame central axis that is a central axis of the frame.

In the disc brake according to this form, each of the number of the first pressing members and the number of the second pressing members may be one or more. In the case where each of the number of the first pressing members and the number of the second pressing members is one, each of the resultant forces is a corresponding one of the pressing forces of the first pressing member and the second pressing member.

(2) The disc brake according to the above form (1),
wherein the pressing device comprises a plurality of second pressing members, as the at least one second pressing member, spaced apart from each other in a circumferential direction, and
wherein a sum of at least one distance each between the frame central axis and a corresponding one of at least one of a plurality of second central axes, which at least one is located on the leading side of the frame central axis, is greater than a sum of at least one distance each between the frame central axis and a corresponding one of at least one of the plurality of second central axes, which at least one is located on the trailing side of the frame central axis, and the plurality of second central axes are respective central axes of the plurality of second pressing members.

Since the second pressing members are arranged so as to be spaced apart from each other in the circumferential direction, it is possible to uniform a force applied to the frame when compared with the case where the number of the second pressing members is one. In the disc brake according to this form, even in the case where the plurality of second pressing members apply substantially the same pressing force to the frame, the point of action of the resultant force of the pressing forces applied from the respective second pressing members to the frame is located on the leading side of the frame central axis.

(3) The disc brake according to the above form (1) or (2),
wherein the pressing device comprises two second pressing members as the at least one second pressing member,
wherein one of the two second pressing members is located on the leading side of the frame central axis, and the other of the two second pressing members is located on the trailing side of the frame central axis, and
wherein a distance between a central axis of the one of the two second pressing members and the frame central axis is greater than a distance between a central axis of the other of the two second pressing members and the frame central axis.

The central axis of the second pressing member located on the leading side of the frame central axis may be referred to as "leading-side second central axis", and the central axis of the second pressing member located on the trailing side of the frame central axis may be referred to as "trailing-side second central axis". The second pressing member located on the leading side of the frame central axis is a second pressing member, of which central axis is located on the leading side of the frame central axis. The second pressing member located on the trailing side of the frame central axis is a second pressing member, of which central axis is located on the trailing side of the frame central axis. These configurations apply to the present specification.

(4) The disc brake according to any one of the above forms (1) through (3),
wherein the pressing device comprises a plurality of second pressing members, as the at least one second pressing member, spaced apart from each other in a circumferential direction, and
wherein a pressing force applied to the frame from one of the plurality of second pressing members which is located on the leading side of the frame central axis is greater than a pressing force applied to the frame from one of the plurality of second pressing members which is located on the trailing side of the frame central axis.

In the disc brake according to this form, even in the case where a distance between the frame central axis and the second central axis is substantially the same among the plurality of second pressing members, the point of action of a resultant force of pressing forces applied from the respective second pressing members to the frame is located on the leading side of the frame central axis.

(5) The disc brake according to any one of the above forms (1) through (4),
wherein the pressing device comprises a plurality of second pressing members as the at least one second pressing member,
wherein the disc brake is operable by a hydraulic pressure,
wherein an identical hydraulic pressure is applied to the plurality of second pressing members, and
wherein a sum of at least one pressure receiving area of at least one second pressing member of the plurality of second pressing members which is located on the leading side is greater than a sum of at least one pressure receiving area of at least one second pressing member of the plurality of second pressing members which is located on the trailing side.

In the disc brake according to this form, the point of action of the resultant force of the pressing forces applied from the respective second pressing members to the frame is located on the leading side of the frame central axis.

(6) The disc brake according to any one of the above forms (1) through (5),
wherein the disc brake is operable by a hydraulic pressure,
wherein an identical hydraulic pressure is applied to the at least one second pressing member and the at least one first pressing member, and
wherein a sum of at least one pressure receiving area of the at least one second pressing member and a sum of at least one pressure receiving area of the at least one first pressing member are equal to each other.

A pressing force applied to the inner pad and a pressing force applied to the outer pad can be made substantially equal to each other, making it possible to stably operating the disc brake.

(7) The disc brake according to any one of the above forms (1) through (6),
wherein a central axis of a selected first pressing member that is one of the at least one first pressing member and a central axis of a selected second pressing member that is one of the at least one second pressing member are located on an identical straight line, and
wherein a portion of the selected first pressing member and a portion of the selected second pressing member overlap each other when viewed in the circumferential direction, and the selected first pressing member and the selected second pressing member are movable relative to each other.

In the disc brake according to this form, the length in the axial direction can be reduced.

(8) The disc brake according to any one of the above form (7),
wherein each of the selected first pressing member and the selected second pressing member has a substantially cylindrical shape having a closed bottom and is provided such that a bottom portion of said each of the selected first pressing member and the selected second pressing member is nearer to the inner pad than a cylindrical portion of said each of the selected first pressing member and the selected second pressing member,
wherein an inside diameter of the cylindrical portion of the selected first pressing member is greater than an outside diameter of the bottom portion of the selected second pressing member, and
wherein the selected second pressing member and the selected first pressing member overlap each other in the radial direction in a state in which the bottom portion of the selected second pressing member is located on an inner circumferential side of the cylindrical portion of the selected first pressing member.

(9) The disc brake according to the above form (8),
wherein the disc brake is operable by a hydraulic pressure, and
wherein a space located on an inner circumferential side of the cylindrical portion of the selected first pressing member is a hydraulic-pressure chamber.

(10) The disc brake according to any one of the above forms (1) through (9), wherein a sum of at least one pressing force applied from the at least one second pressing member to the frame is substantially equal to a sum of at least one pressing force applied from the at least one first pressing member to the inner pad.

The present disc brake is not limited to a hydraulic disc brake operable by a hydraulic pressure and may be an electric disc brake operable by an electric actuator.

(11) The disc brake according to any one of the above forms (1) through (10),
wherein the inner pad comprises an inner-side friction engagement member held by a back board, and
wherein the outer pad comprises an outer-side friction engagement member which has a volume equal to that of the inner-side friction engagement member and which is greater in surface area than the inner-side friction engagement member and less in thickness in the axial direction than the inner-side friction engagement member.

(12) The disc brake according to any one of the above forms (1) through (11),
wherein the pressing device comprises a plurality of second pressing members as the at least one second pressing member,
wherein each of (i) the at least one first pressing member and (ii) at least one second pressing member of the plurality of second pressing members which is located on a central axis coinciding with a central axis of each of the at least one first pressing member, and each of the plurality of second pressing members except the at least one second pressing member are spaced apart from each other in a circumferential direction when viewed in the axial direction, and
wherein a portion of each of the at least one first pressing member and a portion of each of the plurality of second pressing members overlap each other when viewed in the circumferential direction.

(13) The disc brake according to any one of the above forms (1) through (12),
wherein the pressing device comprises one first pressing member as the at least one first pressing member, and
wherein a first central axis that is a central axis of the one first pressing member is located on the trailing side of the centroid of the inner pad.

(14) A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
one first pressing member and a plurality of second pressing members held by the housing, the one first pressing member being movable toward the rotor, the plurality of second pressing members being movable away from the rotor; and a frame held by the housing so as to be movable relative to the housing in an axial direction parallel with a rotation axis of the rotor, the frame being configured to be moved by movement of the plurality of second pressing members to press the outer pad against the rotor.

The disc brake according to this form may incorporate the technical feature according to any one of the above forms (1) through (13).

(15) The disc brake according to the above form (14),
wherein the pressing device comprises three second pressing members, as the plurality of second pressing members, spaced apart from each other in the circumferential direction,
wherein a central second central axis that is a central axis of a central second pressing member which is a central one of the three second pressing members is located on a reference central axis that is a central axis of the pressing device,
wherein one of two second pressing members of the three second pressing members which are located respectively on opposite sides of the central second pressing member is a trailing-side second pressing member that is located on the trailing side of the reference central axis, and
wherein the other of the two second pressing members is a leading-side second pressing member located on the leading side of the reference central axis.

For example, in the case where a pressing force produced by the trailing-side second pressing member is less than a pressing force produced by the leading-side second pressing member, a point of action of a resultant force of pressing forces of the plurality of second pressing members can be set to a position located on the leading side of the central axis of the frame. In the case where a distance between a central axis of the trailing-side second pressing member and the frame central axis is less than a distance between a central axis of the leading-side second pressing member and the frame central axis, the point of action of the resultant force of the pressing forces of the plurality of second pressing members can be set to a position located on the leading side of the frame central axis. In the second embodiment, the central second pressing member corresponds to the second piston 104, the leading-side second pressing member corresponds to the second piston 102, and the trailing-side second pressing member corresponds to the second piston 106.

(16) The disc brake according to the above form (14) or (15), wherein a portion of each of the plurality of second pressing members and a portion of the one first pressing member overlap each other when viewed in the circumferential direction.

What is claimed is:
1. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
    at least one first pressing member and at least one second pressing member held by the housing, the at least one first pressing member being movable toward the rotor, the at least one second pressing member being movable away from the rotor; and
    a frame held by the housing so as to be movable relative to the housing in an axial direction parallel with a rotation axis of the rotor, the frame being configured to be moved by movement of the at least one second pressing member to press the outer pad against the rotor, and
wherein the disc brake has at least one of (i) a configuration in which a point of action of a resultant force of at least one pressing force applied from the at least one first pressing member to the inner pad is located on a trailing side of a centroid of the inner pad, and (ii) a configuration in which a point of action of a resultant force of at least one pressing force applied from the at least one second pressing member to the frame is located on a leading side of a frame central axis that is a central axis of the frame,
wherein the pressing device comprises a plurality of second pressing members, as the at least one second pressing member, spaced apart from each other in a circumferential direction, and
wherein a sum of at least one distance each between the frame central axis and a corresponding one of at least one of a plurality of second central axes, which at least one is located on the leading side of the frame central axis, is greater than a sum of at least one distance each between the frame central axis and a corresponding one of at least one of the plurality of second central axes, which at least one is located on the trailing side of the frame central axis, and the plurality of second central axes are respective central axes of the plurality of second pressing members.

2. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
    at least one first pressing member and at least one second pressing member held by the housing, the at least one first pressing member being movable toward the rotor, the at least one second pressing member being movable away from the rotor; and
    a frame held by the housing so as to be movable relative to the housing in an axial direction parallel with a rotation axis of the rotor, the frame being configured to be moved by movement of the at least one second pressing member to press the outer pad against the rotor, and
wherein the disc brake has at least one of (i) a configuration in which a point of action of a resultant force of at least one pressing force applied from the at least one first pressing member to the inner pad is located on a trailing side of a centroid of the inner pad, and (ii) a configuration in which a point of action of a resultant force of at least one pressing force applied from the at least one second pressing member to the frame is located on a leading side of a frame central axis that is a central axis of the frame,
wherein the pressing device comprises two second pressing members as the at least one second pressing member,
wherein one of the two second pressing members is located on the leading side of the frame central axis, and the other of the two second pressing members is located on the trailing side of the frame central axis, and wherein a distance between a central axis of the one of the two second pressing members and the frame central axis is greater than a distance between a central axis of the other of the two second pressing members and the frame central axis.

3. A disc brake of a floating type, comprising:

an inner pad and an outer pad respectively located on opposite sides of a rotor rotatable with a wheel;

a pressing device configured to press the inner pad and the outer pad against the rotor; and a housing mounted on a non-rotating member and holding the pressing device, wherein the pressing device comprises:
   at least one first pressing member and at least one second pressing member held by the housing, the at least one first pressing member being movable toward the rotor, the at least one second pressing member being movable away from the rotor; and
   a frame held by the housing so as to be movable relative to the housing in an axial direction parallel with a rotation axis of the rotor, the frame being configured to be moved by movement of the at least one second pressing member to press the outer pad against the rotor, and wherein the disc brake has at least one of (i) a configuration in which a point of action of a resultant force of at least one pressing force applied from the at least one first pressing member to the inner pad is located on a trailing side of a centroid of the inner pad, and (ii) a configuration in which a point of action of a resultant force of at least one pressing force applied from the at least one second pressing member to the frame is located on a leading side of a frame central axis that is a central axis of the frame, wherein the pressing device comprises a plurality of second pressing members, as the at least one second pressing member, spaced apart from each other in a circumferential direction, and wherein a sum of at least one pressing force applied to the frame from at least one second pressing member of the plurality of second pressing members which is located on the leading side of the frame central axis is greater than a sum of at least one pressing force applied to the frame from at least one second pressing member of the plurality of second pressing members which is located on the trailing side of the frame central axis.

4. The disc brake according to claim 1, wherein the disc brake is operable by a hydraulic pressure, wherein an identical hydraulic pressure is applied to the at least one second pressing member and the at least one first pressing member, and wherein a sum of at least one pressure receiving area of the at least one second pressing member and a sum of at least one pressure receiving area of the at least one first pressing member are equal to each other.

5. A disc brake of a floating type, comprising:

an inner pad and an outer pad respectively located on opposite sides of a rotor rotatable with a wheel;

a pressing device configured to press the inner pad and the outer pad against the rotor; and a housing mounted on a non-rotating member and holding the pressing device, wherein the pressing device comprises:
   at least one first pressing member and at least one second pressing member held by the housing, the at least one first pressing member being movable toward the rotor, the at least one second pressing member being movable away from the rotor; and
   a frame held by the housing so as to be movable relative to the housing in an axial direction parallel with a rotation axis of the rotor, the frame being configured to be moved by movement of the at least one second pressing member to press the outer pad against the rotor, and wherein the disc brake has at least one of (i) a configuration in which a point of action of a resultant force of at least one pressing force applied from the at least one first pressing member to the inner pad is located on a trailing side of a centroid of the inner pad, and (ii) a configuration in which a point of action of a resultant force of at least one pressing force applied from the at least one second pressing member to the frame is located on a leading side of a frame central axis that is a central axis of the frame, wherein the pressing device comprises a plurality of second pressing members as the at least one second pressing member, wherein each of (i) one of the at least one first pressing member and (ii) one of the plurality of second pressing members which is located on an axis coinciding with a central axis of the one of the at least one first pressing member, and each of the plurality of second pressing members except the one of the second pressing member are spaced apart from each other in a circumferential direction when viewed in the axial direction, and wherein a portion of each of the at least one first pressing member and a portion of each of the plurality of second pressing members overlap each other when viewed in the circumferential direction.

6. The disc brake according to claim 1, wherein the pressing device comprises one first pressing member as the at least one first pressing member, and wherein a first central axis that is a central axis of the one first pressing member is located on the trailing side of the centroid of the inner pad.

7. A disc brake of a floating type, comprising:

an inner pad and an outer pad respectively located on opposite sides of a rotor rotatable with a wheel;

a pressing device configured to press the inner pad and the outer pad against the rotor; and a housing mounted on a non-rotating member and holding the pressing device, wherein the pressing device comprises:
   one first pressing member and a plurality of second pressing members held by the housing, the one first pressing member being movable toward the rotor, the plurality of second pressing members being movable away from the rotor; and
   a frame held by the housing so as to be movable relative to the housing in an axial direction parallel with a rotation axis of the rotor, the frame being configured to be moved by movement of the plurality of second pressing members to press the outer pad against the rotor, wherein the plurality of second pressing members are spaced apart from each other in a circumferential direction, and wherein a sum of at least one distance each between the frame central axis and a corresponding one of at least one of a plurality of second central axes, which at least one is located on the leading side of the frame central axis, is greater than a sum of at least one distance each between the frame central axis and a corresponding one of at least one of the plurality of second central axes, which at least one is located on the trailing side of the frame central axis, and the plurality of second central axes are respective central axes of the plurality of second pressing members.

8. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
  one first pressing member and a plurality of second pressing members held by the housing, the one first pressing member being movable toward the rotor, the plurality of second pressing members being movable away from the rotor; and
  a frame held by the housing so as to be movable relative to the housing in an axial direction parallel with a rotation axis of the rotor, the frame being configured to be moved by movement of the plurality of second pressing members to press the outer pad against the rotor,
wherein the pressing device comprises two second pressing members as the plurality of second pressing members,
wherein one of the two second pressing members is located on the leading side of the frame central axis, and the other of the two second pressing members is located on the trailing side of the frame central axis, and
wherein a distance between a central axis of the one of the two second pressing members and the frame central axis is greater than a distance between a central axis of the other of the two second pressing members and the frame central axis.

9. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
  one first pressing member and a plurality of second pressing members held by the housing, the one first pressing member being movable toward the rotor, the plurality of second pressing members being movable away from the rotor; and
  a frame held by the housing so as to be movable relative to the housing in an axial direction parallel with a rotation axis of the rotor, the frame being configured to be moved by movement of the plurality of second pressing members to press the outer pad against the rotor,
wherein the plurality of second pressing members are spaced apart from each other in a circumferential direction, and
wherein a sum of at least one pressing force applied to the frame from at least one second pressing member of the plurality of second pressing members which is located on the leading side of the frame central axis is greater than a sum of at least one pressing force applied to the frame from at least one second pressing member of the plurality of second pressing members which is located on the trailing side of the frame central axis.

10. A disc brake of a floating type, comprising:
an inner pad and an outer pad respectively located on opposite sides of a rotor rotatable with a wheel;
a pressing device configured to press the inner pad and the outer pad against the rotor; and
a housing mounted on a non-rotating member and holding the pressing device,
wherein the pressing device comprises:
  one first pressing member and a plurality of second pressing members held by the housing, the one first pressing member being movable toward the rotor, the plurality of second pressing members being movable away from the rotor; and
  a frame held by the housing so as to be movable relative to the housing in an axial direction parallel with a rotation axis of the rotor, the frame being configured to be moved by movement of the plurality of second pressing members to press the outer pad against the rotor,
wherein each of (i) the one first pressing member and (ii) one of the plurality of second pressing members which is located on an axis coinciding with a central axis of the one first pressing member, and each of the plurality of second pressing members except the one of the second pressing members are spaced apart from each other in a circumferential direction when viewed in the axial direction, and
wherein a portion of each of the one first pressing member and a portion of each of the plurality of second pressing members overlap each other when viewed in the circumferential direction.

* * * * *